United States Patent [19]

Johnson

[11] Patent Number: 4,844,528
[45] Date of Patent: Jul. 4, 1989

[54] REMOVABLE REAR MOUNTED STORAGE TRUNK FOR VEHICLES

[76] Inventor: S. Robert Johnson, 626 Eastern Ave., Greenville, Ill. 62246

[21] Appl. No.: 196,737

[22] Filed: May 20, 1988

[51] Int. Cl.⁴ .............................................. B60R 9/00
[52] U.S. Cl. ..................... 296/37.1; 280/769
[58] Field of Search ............... 296/37.1, 37.6, 26, 296/166; 280/415 R, 769

[56] References Cited

U.S. PATENT DOCUMENTS

| | | | |
|---|---|---|---|
| 3,420,566 | 1/1969 | Obra | 296/166 |
| 3,730,580 | 5/1973 | Page, Jr. | 296/26 |
| 3,888,539 | 6/1975 | Niessner | 296/26 |
| 3,937,516 | 2/1976 | Chapman | 296/26 |
| 4,139,229 | 2/1979 | Cooper | 296/26 |

Primary Examiner—Robert R. Song
Attorney, Agent, or Firm—Polster, Polster & Lucchesi

[57] ABSTRACT

A removable, rear mounted storage trunk for vehicles is adapted for mounting relative to a rear bumper of a vehicle. The trunk includes a structural undercarriage which supports the trunk from below and an overhanging portion which extends beyond the structural undercarriage for rest and support upon the rear bumper of the vehicle. The storage trunk further includes retractable wheeled legs which are capable of being extended when the trunk is removed from the vehicle for mobile positioning of the trunk to a selected location.

8 Claims, 2 Drawing Sheets

1

REMOVABLE REAR MOUNTED STORAGE TRUNK FOR VEHICLES

BACKGROUND OF THE INVENTION

The present invention relates to a removable rear mounted storage trunk for vehicles which can be removably detached from the vehicle for mobile positioning to a selected location.

Some vehicle designs have not always accommodated the user's need for trunk space. Station wagons for example, sometimes have limited space behind the rearmost seat. To offset this problem, cargo carriers have been developed which mount to the roofs of station wagons. Some of these cargo carriers are simply cargo rails, to which luggage can be secured. In other cases, large and enclosed luggage carriers are themselves mounted to the roofs of vehicles. In either case, the "trunk space" of such vehicles has been enlarged.

Vans have had "trunk space" problems similar to station wagons; however, the problem has been more acute because vans are taller than station wagons, making loading and unloading of luggage and other items even more difficult. With the downsizing of many vehicles, the "trunk space" availability in downsized vehicles has decreased; however, the desire for sufficient "trunk space" has not diminished.

Even if any of the aforementioned variety of cargo carriers could be mounted on the roofs of vans, such as in station wagons, the loading and unloading of luggage and other cargo normally requires several trips between the vehicle an place of embarkation/arrival. Thus, it would be desirable to have a removable storage trunk in which luggage and other cargo items could be stored during trips, but which could then be easily removed and re-positioned by the user to a selected location.

U.S. Pat. No. 3,420,566 shows a removable camper body, described as a "papoose", attached to the rear of a van and also having extendable wheeled legs for lowering to the ground in order to assist in attaching and detaching the "papoose" relative to the van. The "papoose" in this patent is designed to convert the van into a camping vehicle by using the removable "papoose" body as a kitchen. While this patent has some overall general applicability to the subject matter under discussion, it is apparent that this patent has not solved the need for extra "trunk space" in vehicles while also facilitating loading and unloading of the extra "trunk space", as well as mobile positioning of the extra "trunk space"

SUMMARY OF THE INVENTION

Among the several objects and features of this invention may be noted:

The provision of a new and improved removable rear mounted storage trunk for vehicles;

The provision of such a removable rear mounted storage trunk which facilitates attachment/detachment from the vehicle, as well as movement from a loading station and subsequent re-positioning to a selected location following unloading;

The provision of such a removable rear mounted storage trunk which is supported by a vehicle when attached thereto, including having its own structural undercarriage that is structurally interconnected to the vehicle, for supporting the storage trunk;

The provision of such a removable rear mounted storage trunk which also uses extendable wheeled legs for mobile positioning of the storage trunk to and from the vehicle; and The provision of such a removable rear mounted storage trunk which is a convenient, economical, provides quick loading/unloading, is easy to operate and move, and which overcomes the deficiencies, while retaining all of the advantages, of related prior art devices and constructions.

Briefly stated, the removable rear mounted storage trunk for vehicles of the present invention is adapted to be attached to a trailer hitch positioned in proximity to a rear bumper of the vehicle. The trunk includes a structural undercarriage which supports the trunk from below. A hitch connecting arm extends from and is structurally interconnected to the structural undercarriage for attachment to the trailer hitch. The trunk includes an overhanging portion which extends beyond the structural undercarriage so as to rest upon the rear bumper of the vehicle for support thereby when the hitch connecting arm is attached to the trailer hitch. The trunk further is provided with retractable wheeled legs which are capable of being extended when the trunk is removed from the vehicle for mobile positioning of the trunk to a selected location.

Other objects and features of this invention will become apparent from the ensuing description.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
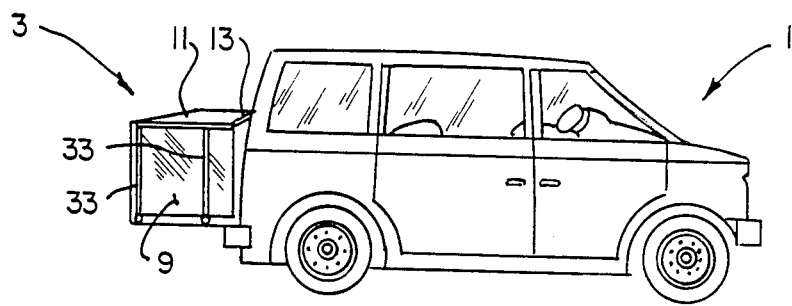
FIG. 1 is a side perspective view showing the removable rear mounted storage trunk of the present invention attached to a van-type vehicle.

The removable rear mounted storage trunk of the present invention has been constructed for use with various types and kinds of family vans, as shown in the drawings. However, it is to be understood that the removable rear mounted storage trunks may also be used with other types of vehicles as desired.

Figure 2:
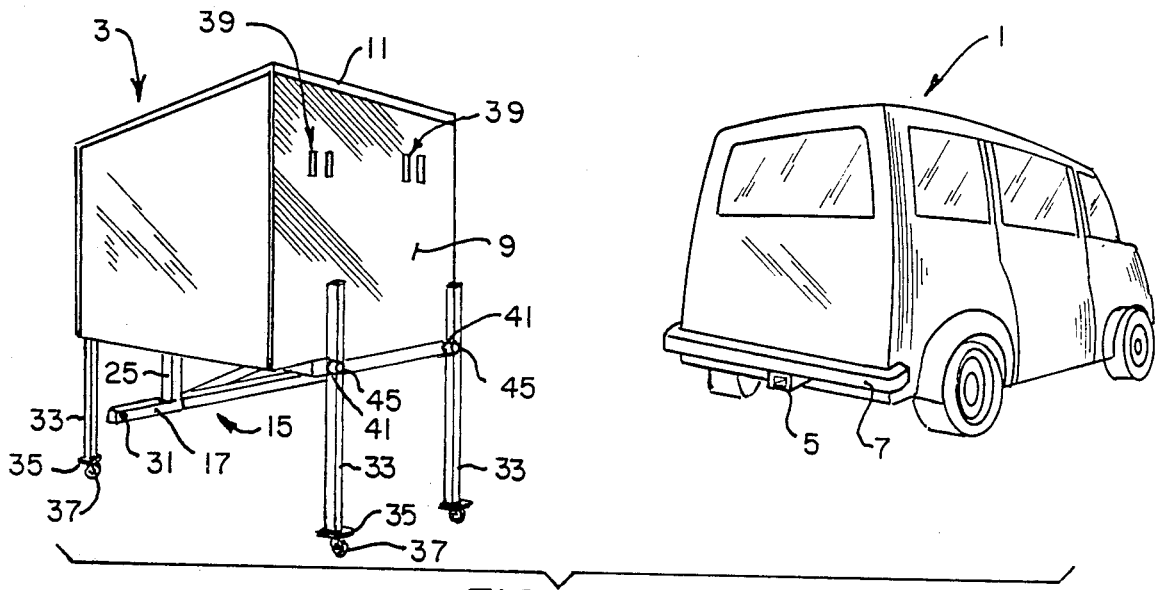
FIG. 2 is an exploded perspective view illustrating the separation of the removable rear mounted storage trunk from the vehicle, including the use of the extendable wheeled legs for mobile positioning the storage trunk to and from the vehicle.

The family van 1 shown in FIGS. 1-2 of the drawings is a scaled-down or "down-sized" van. These newer family vans 1 have retained luggage and storage space behind the rearmost seat, although the area for storage of cargo behind the rearmost seat has, unfortunately, been reduced. Since occupants of the newer family vans 1 still ride higher than most other vehicles, the convenience of a cargo carrier on the roof of the van is diminished by the impracticality of safe loading and unloading of a roof top carrier on the van. Thus, the removable rear mounted storage trunk of the present invention offers some practical options and considerations not heretofore available.

The removable rear mounted storage trunk 3 of the present invention is adapted to be attached to a trailer hitch 5 positioned in proximity to a rear bumper 7 of the van 1. When mounted to the van 1, the removable rear mounted storage trunk 3 is positioned as shown in FIG. 1, and when separated from the van 1, the trunk 3 is capable of mobile positioning as shown in FIG. 2 of the drawings.

The storage trunk 3 is a generally rectangular-shaped enclosed body or compartment 9 having a cover or top 11 hinged or pivotally mounted to the body 9 as at 13. Preferably, this hinge or pivotally mounted connection 13 is adjacent the rear of the storage trunk 3 when mounted on the van 1 in order to permit the cover 11 to be open and closed for loading and unloading the storage trunk 3, while mounted to the van.

The storage trunk 3 includes a structural undercarriage generally identified at 15, which supports the storage trunk 3 from below. A hitch connecting arm 17 extends from and is structurally interconnected to the structural undercarriage 15 for attachment to the trailer hitch 5. As shown in the drawings, the hitch connecting arm 17 has a square-tube construction which is received within a corresponding complementary opening provided in the trailer hitch 5, as shown in FIGS. 2-3 of the drawings.

Figures 3, 4:
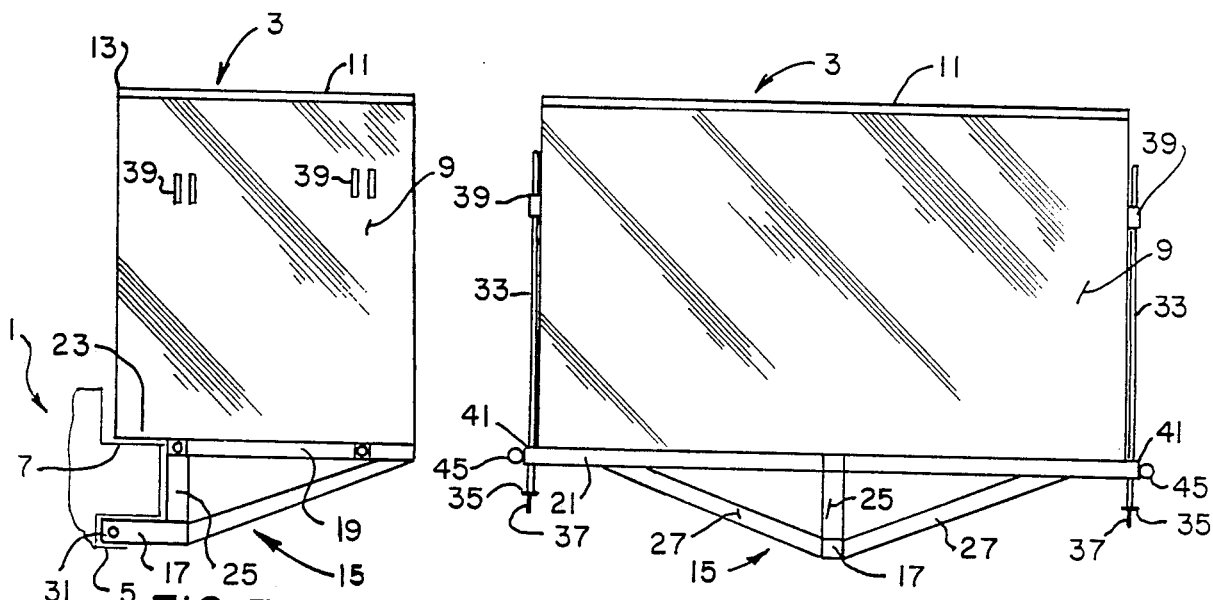
FIG. 3 is a side elevational view with parts removed for clarity of the trunk of FIG. 1 illustrating the construction of the removal rear mounted storage trunk of the present invention.
FIG. 4 is a front elevational view of the removable rear mounted storage trunk of the present invention.

The structural undercarriage 15 will be best understood by reference to FIGS. 2-5 of the drawings and the following description. A series of horizontally extending and opposed side beams 19, 19 are structurally interconnected and joined to horizontally extending and opposed end beams 21, 21, such as by welding, to provide underlying support for the storage trunk 3, as shown in the FIG. 5 bottom plan view of the drawings. Each of the horizontally extending beams 19, 19 and 21, 21 extend peripherally around the storage trunk 3, except at the rear of the storage trunk where an overhanging portion 23 of the storage trunk 3 extends beyond the structural undercarriage 15 so as to rest upon the rear bumper 7 of the van 1 for support thereby when the hitch connecting arm 17 is attached and mounted within a trailer hitch 5, as best shown in FIG. 3 of the drawings.

Figure 5:
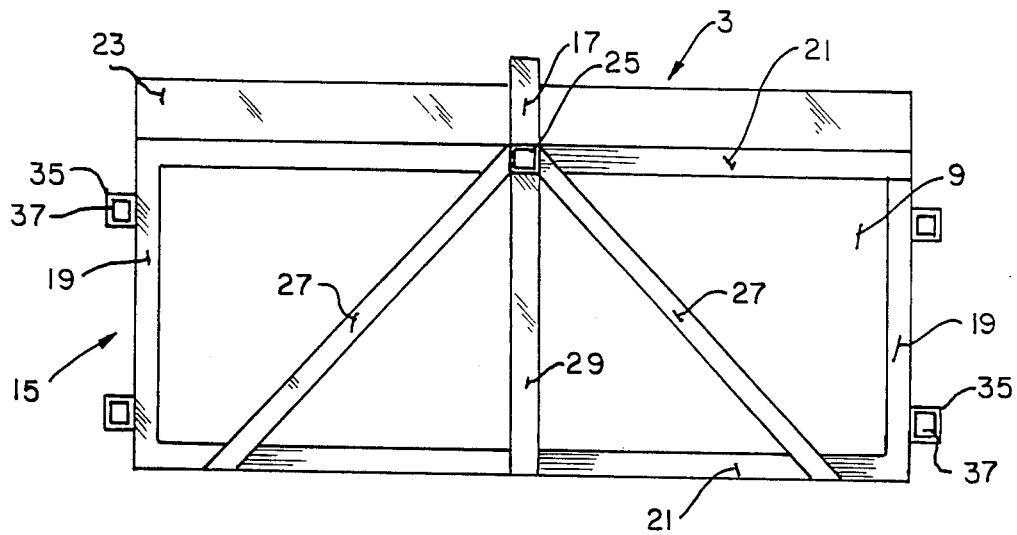
FIG. 5 is a bottom plan view of the removable rear mounted storage trunk for vehicles with portions removed for clarity, specifically illustrating the structural undercarriage for the storage trunk.

In addition to the horizontally extending supporting beams 19, 19 and 21, 21 as shown in FIG. 5 of the drawings, the structural undercarriage 15 further includes cantilevered supporting beams which assist in supporting those portions of the storage trunk 3 which do not rest upon the rear bumper 7. Specifically, a vertically extending supporting beam 25 is structurally interconnected to and underlies the horizontally extending end beam 21 adjacent the overhanging portion 23 of the storage trunk 3. The vertically extending supporting beam 25 extends between its associated horizontally extending supporting beam 21 and the hitch connecting arm 17, also in a structurally interconnected relationship, such as by welding. A plurality of diagonally extending supporting beams 27 are connected to the vertically extending supporting beam 25 adjacent its lower end, as shown in FIGS. 3-5, and extend upwardly therefrom to the horizontally extending end beam 21 which underlies the storage trunk 3 at an end opposite from the overhanging portion 23.

The diagonally extending supporting beams 27, 27 are structurally interconnected to the vertically extending supporting beam 25 and its associated horizontally extending end beam 21, such as by welding. Intermediate the diagonally extending supporting beams 27, 27 is a middle supporting beam 29 which also extends upwardly from the vertical supporting beam 25 and is integrally and structurally interconnected to the horizontally extending supporting beam 21 in the same manner as the diagonally and upwardly extending supporting beams 27, 27.

The hitch connecting arm 17 is also connected to the vertically extending supporting beam 25 at its lower end, but extends in a direction generally opposite from the diagonally extending supporting arms 27, 27 and middle supporting beam 29, for insertion within the complementary shaped opening of the hitch 5. As shown in FIGS. 3 and 5 of the drawings, the hitch connecting arm 17 also extends beyond the overhanging portion 23 of the storage trunk 3 in order that the hitch connecting arm 17 can be received within the hitch 5, while allowing the overhanging portion 23 of the storage trunk 3 to rest upon and be supported by the rear bumper 7 of the van 1. The free end of the hitch connecting arm 17 may also be provided with an opening 31 which can be aligned with a corresponding opening (not shown) in the hitch 5 in order that a pin or locking mechanism may be inserted therein.

When the storage trunk 3 is mounted to the van as shown in FIG. 1 of the drawings, the overhanging portion 23 of the storage trunk 3, which extends beyond the structural undercarriage 15, thus rests upon the rear bumper 7 of the van 1, as best seen in FIG. 3 of the drawings. In this position, the hitch connecting arm 17 is fully mounted and assembled to the hitch 5. At the same time, the structural undercarriage 15, with its horizontally extending supporting beams 19, 19 and 21, 21, its vertically extending supporting beam 25, its diagonally extending supporting beams 27, 27, together with the intermediate supporting beam 29, provides underlying support for the storage trunk 3 in areas spaced from the rear bumper 7 of the van, as will be appreciated. The structural interconnection of the structurally undercarriage 15, such as by welding the supporting beams to one another as a unitary interconnected structure, enhances and reinforces the structural undercarriage of the storage trunk 3.

In order to facilitate loading/unloading of the storage trunk 3 relative to the van 1, as well as mobile positioning of the storage trunk 3 to and from the van 1, a plurality of retractable wheeled legs 33 are provided. Each of the retractable wheeled legs 33 are maintained in a retracted position, as shown in FIG. 1, when the storage trunk 3 is mounted to the van 1; however, each of the four retractable wheeled legs 33 may be extended, as shown in FIG. 2 of the drawings, to facilitate loading/unloading of the storage trunk 3 relative to the van 1, as well as subsequent positioning of the storage trunk 3 to a desired location.

Each of the retractable wheeled legs 33 have a flange 35 adjacent the lower end thereof to which a wheel 37 is mounted, in a suitable manner as is well known. Upper and lower channels 39, 41, respectively, for receiving and guiding the retractable wheel legs 33, are integrally attached to the rectangular-shaped body 9 of the storage trunk 3, as shown in FIGS. 2–4 of the drawings. Each of the upper channels 39 slidably receive the retractable legs 33 when the legs 33 are retracted (the position shown in FIG. 1 of the drawings).

Figure 6:
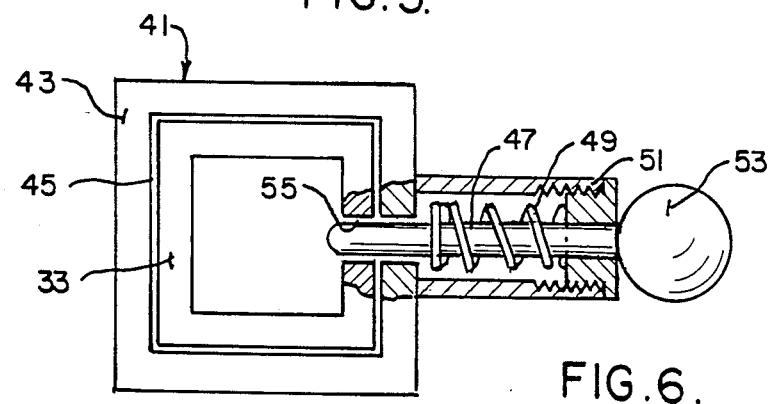
FIG. 6 is a top plan view, partially in section, illustrating a spring biased adjusting pin which is capable of being positioned into and out of engagement relative to complementary openings in the extendable wheeled legs for adjusting the height of the legs, as desired.
Figure 7:
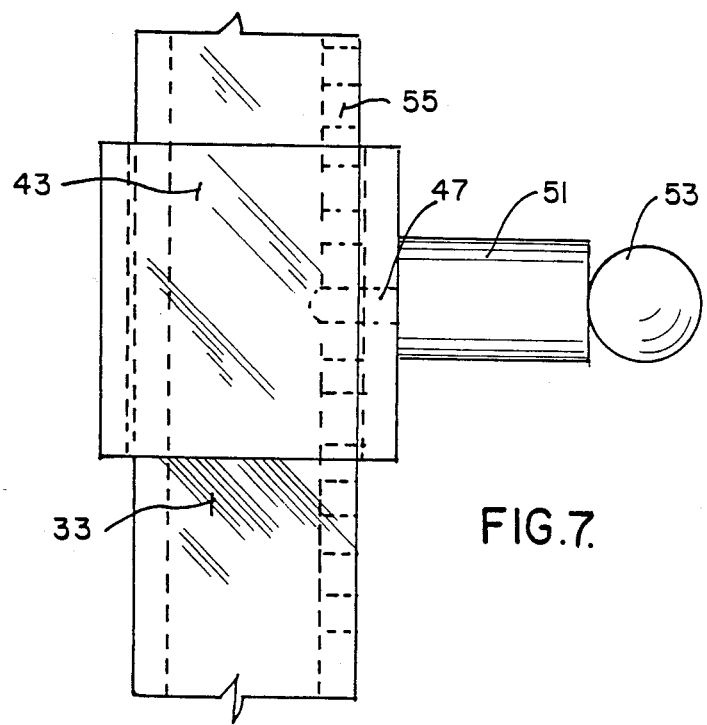
FIG. 7 is a side elevational view of the spring biased adjusting pin and housing assembly shown in FIG. 6, with various complementary openings formed in one of the extendable legs, denoting a variety of positions for the extendable legs relative to the storage trunk.

The lower channels 41 comprise a slidable leg housing 43, as best seen in FIGS. 6–7 of the drawings, for continuously and slidably receiving the retractable wheeled legs 33 therein. The legs 33 are formed from a square-tube construction in order to provide peripheral strength to each of the legs 33. The slidable leg housing 43 has a complementary inner shape 45 which corresponds to the outer configuration of the legs 33. Also associated with each of the slidable leg housings 43 is a spring biased adjusting pin 47. Each spring biased adjusting pin 47 has a convolutely wound spring 49 wound thereabout as shown in FIG. 6 of the drawings, captured within a spring housing 51. The spring biased adjusting pin 47 extends through the spring housing 51 and is spring biased and retained by the helically wound spring 49 within the spring housing 51.

Helical spring 49 is compressed as the enlarged head 53 of the adjusting pin is moved to the right, as shown in FIG. 6 of the drawings. This movement withdraws the opposite end of the adjusting pin 47 from mating engagement with a complementary opening 55 formed in each of the retractable wheeled legs 33. As shown in FIGS. 7 of the drawings, each of the retractable wheeled legs 33 are provided with a vertical series of complementary shaped openings 55 which are adapted to receive a spring biased adjusting pin 47, to allow the retractable wheeled legs 33 to be positioned at a variety of heights relative to the storage trunk 3, as will be understood.

From the foregoing, it will be appreciated that the removable rear mounted storage trunk provides extra "trunk space" for vans and other vehicles, while affording mobile positioning of the storage trunk to and from the vehicles, to assist in the loading and unloading of the vehicles. It will thus be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

I claim:

1. A removable rear mounted storage trunk for vehicles which is adapted to be attached to a trailer hitch positioned in proximity to a rear bumper of said vehicle, said trunk including a structural undercarriage which supports said trunk from below, said undercarriage including horizontally extending beams extending peripherally about and below said trunk and cantilevered supporting beams underlying and supporting said horizontally extending beams, a hitch connecting arm extending from and structurally interconnected to said structural undercarriage for attachment to said trailer hitch, said trunk including an overhanging portion which extends beyond said structural undercarriage so as to rest upon the rear bumper of the vehicle for support thereby when the hitch connecting arm is attached to said trailer hitch, and said trunk further having retractable wheeled legs which are capable of being extended when the trunk is removed from the vehicle for mobile positioning of the trunk to a selected location.

2. The removable rear mounted storage trunk as defined in claim 1 wherein said cantilevered supporting beams include a vertically extending beam adjacent the overhanging portion of said trunk, and a plurality of diagonally extending supporting beams connected to said vertically extending supporting beam at its lower end and extending upwardly therefrom to a horizontally extending beam underlying said trunk at an end opposite from said overhanging portion.

3. The removable rear mounted storage trunk as defined in claim 2 wherein said hitch connecting arm is also connected to said vertically extending supporting beam adjacent its lower end and extends in a direction generally opposite from said diagonally extending supporting beams.

4. The removable rear mounted storage trunk as defined in claim 3 wherein said hitch connecting arm extends beyond the overhanging portion of said trunk for attachment to said trailer hitch.

5. The removable rear mounted storage trunk as defined in claim 4 wherein said hitch connecting arm also extends below said rear bumper for attachment to said trailer hitch below said rear bumper.

6. The removable rear mounted storage trunk as defined in claim 1 and further including spring biased adjusting pins attached to said trunk for engaging complementary openings formed in said legs, in order to adjustably position said legs at a variety of heights.

7. The removable rear mounted storage trunk as defined in claim 6 wherein each of said spring biased adjusting pins are received within a slidable leg housing mounted adjacent said horizontally extending beams.

8. The removable rear mounted storage trunk as defined in claim 7 and including upper and lower channels for receiving and guiding said extendable legs relative to said trunk, one of said channels comprising a slidable leg housing including associated spring biased pins for engaging a respective leg.

* * * * *